United States Patent

Takata et al.

[11] Patent Number: 5,754,341
[45] Date of Patent: May 19, 1998

[54] PHASE GRATING, ITS FABRICATING METHOD, OPTICAL ENCODER, MOTOR USING THE OPTICAL ENCODER, AND ROBOT USING THE MOTOR

[75] Inventors: Kazumasa Takata, Moriguchi; Kanji Nishii, Osaka; Kenji Takamoto, Neyagawa; Masami Ito, Moriguchi; Atsushi Fukui, Osaka, all of Japan

[73] Assignee: Matsushita Electric Industrial Co., Ltd., Osaka, Japan

[21] Appl. No.: 661,154

[22] Filed: Jun. 10, 1996

[30] Foreign Application Priority Data

Jun. 8, 1995 [JP] Japan ................... 7-141532

[51] Int. Cl.$^6$ ........................... G02B 5/18
[52] U.S. Cl. .............. 359/569; 359/566; 359/900; 250/231.13; 250/237 G; 216/24
[58] Field of Search ............... 359/566, 569, 359/574, 575, 900; 216/24; 250/231.13, 237 G

[56] References Cited

U.S. PATENT DOCUMENTS

| | | | |
|---|---|---|---|
| 4,082,453 | 4/1978 | Knop | 355/88 |
| 5,234,537 | 8/1993 | Nagano et al. | 359/566 |
| 5,240,550 | 8/1993 | Boehnke et al. | 156/626 |
| 5,279,924 | 1/1994 | Sakai et al. | 359/566 |
| 5,283,690 | 2/1994 | Miyake et al. | 359/566 |

FOREIGN PATENT DOCUMENTS

| | | | |
|---|---|---|---|
| 0531926 | 3/1993 | European Pat. Off. | G02B 5/18 |
| A-63-74014 | 4/1988 | Japan | 359/566 |
| 5150108 | 6/1993 | Japan | G02B 5/18 |

OTHER PUBLICATIONS

*IBM Technical Disclosure Bulletin*, vol. 28, No. 4, Sep. 1985, New York, U.S., pp. 1777–1779, XP002013283, Anonymous: "Electronic Tachometer for Linear Actuators."
*Patent Abstracts of Japan*, vol. 95, No. 007 & JP-A-07 181009 (Matsushita Electric Ind. Co., Ltd.), 18 Jul. 1995

*Primary Examiner*—Paul M. Dzierzynski
*Assistant Examiner*—John Juba, Jr.
*Attorney, Agent, or Firm*—Beveridge, DeGrandi, Weilacher & Young, L.L.P.

[57] ABSTRACT

A phase grating has a concave part of rectangular shape type substantially, of which grating depth is deeper in a specific range than depth d' calculated in a formula $$|n-n_0|\times(p-d'/e)/p\times d'=(\lambda/2)\times(1+2m) \text{ (where } m=0, \pm1, \pm2, \ldots)$$

in terms of center wavelength $\lambda$ of light having partial interference to be diffracted by the phase grating, pitch length p of the phase grating, refractive index n of base material of the phase grating, refractive index $n_0$ of medium surrounding the phase grating, and shape ratio e as the ratio of grating depth to width of slope of the concave part.

13 Claims, 14 Drawing Sheets

Waveform of interference waves of fundamental wave and double frequency wave

Waveform of double frequency wave

Waveform of fundamental wave

Shape ratio e = d/k

Duty f = t/p (PRIOR ART)

PHASE GRATING, ITS FABRICATING METHOD, OPTICAL ENCODER, MOTOR USING THE OPTICAL ENCODER, AND ROBOT USING THE MOTOR

BACKGROUND OF THE INVENTION

1. Field of the Invention

The present invention relates to a phase grating having a nearly rectangular waveform for suppressing 0 order diffraction efficiency, a fabricating method of such phase grating, and an optical encoder, and further to a motor using such optical encoder and a robot using such motor, and more particularly to an optical encoder for observing the moving state, such as rotating state, of a diffraction plate, by feeding spontaneous radiant luminous flux having a interference to the diffraction plate having a phase grating mounted on a moving object, for example, a rotating object, causing the diffraction light passing through the diffraction plate to interfere with each other, and measuring the intensity of interfering light.

2. Related Art of the Invention

Hitherto, the phase grating has been mainly used in coherent light. The phase grating high in ±1st order diffraction efficiency can be used, for example, in the field of light communication, in dividing an optical signal into two sections, or combining two optical signals into one. In this case, a higher efficiency of dividing and combining is desired, and the ±1st order diffraction efficiency is preferred to be as high as possible, and accordingly the 0 order diffraction efficiency should be as small as possible.

The diffraction efficiency of phase grating has been much discussed analytically about coherent light, and the shape and other conditions of phase grating for controlling the diffraction efficiency in coherent light are elucidated.

For example, the grating depth d possessing an ideally rectangular waveform section, by passing mainly ±1st order diffraction light only, and suppressing the 0 order diffraction efficiency, is enough to cause an optical path length difference of an odd number multiple of ½ of wavelength λ by the step difference of concave part and convex part of the grating, and hence it is required to satisfy the following conditions in terms of the center wavelength λ of the light source, refractive index n of the material for composing the phase grating, and refractive index $n_0$ of the surrounding of the phase grating.

$$|n-n_0|\times d = (\lambda/2)\times(1+2m) \quad (1)$$

(where m=0, ±1, ±2, ...)

In other words, the condition of grating depth for minimizing the diffracted light intensity of 0 order can be calculated, approximately, by the "center of gravity" of the phase of the diffracted light. In the phase grating having an ideal rectangular waveform, as shown in FIG. 12 (a), the centers of gravity G and G' of phase are present on the rectangular waveform surface, and when the phase difference between the center of gravity G of the grating for advancing the phase and the center of gravity G' of the grating for delaying the phase is an odd number multiple of ½ of the center wavelength λ of the light source, the diffracted light intensity of 0 order is minimum.

If, however, fabricated through conventional process such as etching, the sectional shape of the phase grating is not an ideal rectangular waveform, but the shape ratio e has a finite value as shown in FIG. 8.

Besides, if fabricated similarly through conventional process such as etching, the curvature of edge is as small as ignorable as compared with the wavelength of the light in the visible region.

Accordingly, the shape parameters of the phase grating comprise three elements, that is, grating depth, shape ratio, and duty. In the phase grating manufacturing process, usually, the grating depth is the easiest one to be controlled among these parameters. Hence, to minimize the 0 order diffraction efficiency, generally, the grating depth is controlled.

In this way, the 0 order diffraction efficiency is controlled by the grating depth, but the shape ratio out of the two remaining parameters is related to the grating depth. As mentioned above, the condition of the grating depth for minimizing the diffracted light intensity of 0 order can be calculated by the "center of gravity" of the phase of the diffracted light, and in the phase grating having a nearly rectangular waveform of which shape ratio is a finite value as shown in FIG. 12 (b), the center of gravity of the phase depends on the inside of the grating, not on the surface.

To minimize the diffracted light intensity of 0 order, the sum of the height of center of gravity G of the grating for advancing the phase and the height of center of gravity G' of the grating for delaying the phase should be an odd number multiple of ½ of the center wavelength λ of the light source, and hence the grating depth d' of the phase grating having a nearly rectangular waveform for minimizing the diffracted light intensity of 0 order will satisfy $$|n-n_0|\times(p-d'/e)/p\times d' = (\lambda/2)\times(1+2m) \quad (2)$$

(where m=0, ±1, ±2, ...) where m=0, ±1, ±2, ..., and p is the length of one pitch of phase grating.

Accordingly, in the phase grating as shown in FIG. 12 (b), the grating depth for minimizing the 0 order diffraction efficiency must be deeper than the phase grating having the ideal rectangular waveform, and the grating depth must be deeper in the phase grating smaller in the value of shape ratio.

This relationship is shown in FIG. 9. FIG. 9 shows the relation of grating depth and 0 order diffraction efficiency, when the shape ratio e is changed, at a constant duty (f=0.5) in a quartz phase grating with one pitch length of 24 µm in air. The axis of abscissas denotes the deviation from the grating depth d calculated in formula 1, supposing m=0, and the axis of ordinates represents the rate of 0 order diffraction efficiency to the 1st order diffraction efficiency.

In the phase grating with an infinite shape ratio, that is, having an ideal rectangular waveform section, the 0 order diffraction efficiency is minimum at the grating depth d calculated in formula 1, supposing m=0, and when the shape ratio has a finite value and as the value is smaller, it is known that the grating depth for minimizing the 0 order diffraction efficiency becomes deeper.

The sectional shape of the phase grating fabricated through the conventional process such as etching is deviated from the ideal rectangular waveform, and hence the grating depth for minimizing the 0 order diffraction efficiency is a larger value than the value calculated in formula 1, supposing m=0.

Assuming this value to be d', d' is calculated in formula 2. If the duty is changed, incidentally, since the height change of center of gravity G and height change of center of gravity G' in FIG. 12 cancel each other, and hence it does not have effect on the grating depth for minimizing the 0 order diffraction efficiency.

This is evident from formula 2. This relationship is shown in FIG. 10. It discloses the relation between the grating depth and 0 order diffraction efficiency when the duty is changed, at constant shape ratio (e=1.2) of the phase grating. The axes of abscissas and ordinates represent same as in FIG. 9. It is known that the duty does not have effect on the depth for minimizing the 0 order diffraction efficiency.

It is accordingly known that the depth d' for minimizing the 0 order diffraction efficiency in the phase grating having a nearly rectangular waveform is calculated in terms of center wavelength of light source, pitch length p of phase grating, refractive index n of material for composing the phase grating, refractive index $n_0$ of the surrounding of the phase grating, and shape ratio e of the phase grating. In the case of light source of induction radiant light of excellent coherence, such as laser light, it is known that the 0 order diffraction efficiency can be suppressed to minimum by defining the grating depth of the phase grating at the calculated value.

The shape and other conditions of the phase grating for controlling the diffraction efficiency in coherent light are thus elucidated.

Nevertheless, if coherent light is used as light source, semiconductor laser or the like for emitting induction radiant light must be used as the light source, and the light source emitting induction radiant light such as semiconductor laser is much inferior in the reliability such as the life as compared to the light source emitting spontaneous radiant light such as an LED, and therefore from the viewpoint of high reliability of light source, it is preferred to use the light source emitting spontaneous radiant light such as LED. Even in the light source of light other than coherent light, however, the shape condition of phase grating for controlling the diffraction efficiency in coherent light is employed.

As the fabricating method of phase grating, etching and various methods are proposed and employed as mentioned above. Yet, these are fabricating methods of phase grating for controlling the diffraction efficiency in coherent light, and little has been discussed about the fabricating method of phase grating for controlling the diffraction efficiency in other light than coherent light.

When positioning in a mechanical device, meanwhile, an optical encoder is widely used. The optical encoder is designed to measure a linear length or a rotating angle, by forming slits in a rotary disk and a fixed mask provided at a specific clearance to the rotary disk, and converting the light passing through both slits into electric signals by a photo detector and issuing as outputs. In this optical encoder, by narrowing the slit pitch, the precision of detection can be enhanced.

In this optical encoder, however, if the pitch of the slits provided in the rotary disk and fixed mask is too narrow, the S/N ratio or the signal-to-noise ratio of the output signal from the photo detector is lowered due to the effect of diffracted light, and the precision of detection drops.

If the slit gap is extended to such an extent that the output signal from the photo detector may not be affected by the diffracted light, the diameter of the rotary disk is increased and the entire device becomes larger in size, and hence the load to the driving member for rotating and driving the rotary disk is increased.

On the other hand, as the optical encoder, an encoder of interference fringe detection type using the diffracted light passing through phase grating is also known. This encoder of interference fringe detection type is designed to convert the interference fringe caused by diffraction and interference of the light passing through the fixed diffraction plate and movable diffraction plate disposed nearly vertically to the optical axis into electric signals by photo detector, and take out.

In this encoder of interference fringe detection type, however, since diffracted lights of plural degrees are emitted from the movable diffraction plate and fixed diffraction plate, the intensity of diffracted light of a specific order necessary for measurement is lowered, and the detection sensitivity drops.

By interfering the diffracted light of ±1st order by using movable diffraction plate and fixed diffraction plate having a phase grating for passing mainly diffracted light of ±1st order only, an optical encoder of the invention as shown in FIG. 7 is proposed to realize a high utilization efficiency of light.

That is, the constitution comprises a light source 31 for emitting coherent light, a fixed diffraction plate 33B and a movable diffraction plate 34B disposed parallel to each other being almost vertical to the optical axis of the light emitted from the light source 31, having phase grating for passing mainly diffracted light of ±1st order only, a photo detector 36 for receiving the light passing through the fixed diffraction plate 33B and movable diffraction plate 34B, and a lens 35 for condensing the diffracted light of ±1st order passing through the fixed diffraction plate 33B and movable diffraction plate 34B in a light detecting part 37 of the photo detector 36.

The light emitted from the light source 31 is transformed into parallel light by a collimating lens 32, and is put into the fixed diffraction plate 33B from a direction nearly vertical to the fixed diffraction plate 33B. The light entering the fixed diffraction plate 33B is diffracted by the fixed diffraction plate 33B, and is emitted as diffracted light 40 of 0 order, diffracted light 41 of +1st order, diffracted light 42 of −1st order. . . .

These diffracted lights 40, 41, 42 are put into the movable diffraction plate 34B, and are further emitted as diffracted lights. Expressing the diffracted lights emitted from the movable diffraction plate 34B to be (n, m) (where n is a diffraction order by fixed diffraction plate 33B, and m is a diffraction order by movable diffraction plate 34B), the diffracted lights passing through the movable diffraction plate 34B comprise diffracted light 50 of (0, 0), diffracted light 51 of (+1, −1), diffracted light 52 of (−1, +1), diffracted light of (−2, +2), diffracted light of (+2, −2), . . .

When the movable diffraction plate 34B is moved at a specified speed in the vertical direction to the optical axis (vertical direction in FIG. 7), the phase of diffracted light of higher order than 0 order is changed relatively to phase of diffracted light of 0 order along with the move, and therefore, for example, the light intensity of the interference wave obtained by interference of diffracted light 51 of (+1, −1) and diffracted light 52 of (−1, +1) changes in sinusoidal waveform.

Similarly, the light intensity of interference light of diffracted light 51 of (+1, −1) and diffracted light 50 of (0, 0), or interference light of diffracted light 52 of (−1, +1) and diffracted light 50 of (0, 0) also changes periodically along with the move of the movable diffraction plate 34B.

The diffracted light 50 of (0, 0) interferes with diffracted light 51 of (+1, −1) or diffracted light 52 of (−1, +1), and the output of the fundamental wave (FIG. 6 (b)) of sinusoidal waveform is obtained, in which the light intensity reaches the maximum when the peak and bottom of the nearly rectangular waveform of fixed diffraction plate 33B and movable diffraction plate 34B are matched, and the light intensity is minimum when the peak and bottom of the nearly rectangular waveform are mutually deviated by half period p/2.

On the other hand, diffracted light 51 of (+1, −1), and diffracted light 52 of (−1, +1) interfere each other, and an output of double frequency (FIG. 6 (b)) composed of a sinusoidal wave having a double frequency of fundamental wave is obtained. In FIG. 7, reference numeral 53 denotes diffracted light of (0, +1), and 54 is diffracted light of (+1, +1).

The photoelectric converted signal output of the photo detector 36 is obtained as a distorted waveform as emphatically shown in FIG. 6 (a). This distorted waveform may be divided into component of fundamental wave and component of double frequency as shown in FIG. 6 (b).

Accordingly, of the light passing through the phase grating, the greater is the rate of diffracted light of 0 order, the larger is the distortion caused in the output signal of the photo detector 36 because of interference of diffracted light of 0 order and diffracted light of ±1st order. Therefore, to suppress the distortion of the output signal of the photo detector 36, it is necessary to decrease the intensity of diffracted light of 0 order as much as possible.

However, the shape and other conditions of the phase grating for controlling the diffraction efficiency of phase grating are disclosed only about coherent light. When coherent light is used as light source, semiconductor laser or the like for emitting induction radiant light must be used as light source. The light source for emitting induction radiant light such as semiconductor laser is very much inferior in reliability such as life as compared with the light source emitting spontaneous radiant light such as LED, and for higher reliability of light source, it is preferred to use the light source emitting spontaneous radiant light such as LED, but even in the case of light source using other light than coherent light, the shape conditions of the phase grating for controlling diffraction efficiency in coherent light are employed.

The present inventor discovered that these conditions are not always established in the light source using other light than coherent light. In the phase grating having a nearly rectangular waveform, in the shape conditions of the phase grating for minimizing the 0 order diffraction efficiency for coherent light, the 0 order diffraction efficiency is not minimum in the light source using spontaneous radiant light.

As the fabricating method of phase grating, various methods have been proposed and realized, but fabricating method of phase grating for controlling diffraction efficiency in other light than coherent light commonly applicable to fabricating method of phase grating for controlling diffraction efficiency of coherent light is not established yet.

Moreover, the optical encoder mentioned above uses coherent light As light source, and hence semiconductor laser or the like emitting induction radiant light must be used as light source, but the light source for emitting induction radiant light such as semiconductor laser is very much inferior in reliability such as life as compared with the light source emitting spontaneous radiant light such as LED. Accordingly, as the light source of the optical encoder as shown in FIG. 7, spontaneous radiant light having partial interference such as LED light is used.

However, the present inventor discovered that the phase grating having a nearly rectangular waveform is not minimum in the 0 order diffraction efficiency for causing distortion in output signal of photo detector due to interference with diffracted light of ±1st order, in the above shape conditions, when spontaneous radiant light is used as light source.

SUMMARY OF THE INVENTION

In the light of the above problems, it is hence an object of the invention, firstly to present a phase grating suppressed in the 0 order diffraction efficiency when using a light source for emitting spontaneous radiant light such as LED, secondly to present a fabricating method of phase grating suppressed in the 0 order diffraction efficiency when using a light source for emitting spontaneous radiant light such as LED, and thirdly to present an optical encoder of high reliability suppressed in distortion of detection signal by using a light source for emitting spontaneous radiant light such as LED and a diffraction plate having the phase grating.

For solving the above problems a phase grating of the present invention of claim 1, has a concave part of rectangular shape type substantially, of which grating depth is deeper in a specific range than depth d' calculated in a formula $$ln - n_0 \times (p - d'/e)/p \times d' = (\lambda/2) \times (1 + 2m) \text{ (where } m = 0, \pm 1, \pm 2, \ldots )$$

in terms of center wavelength $\lambda$ of light having partial interference to be diffracted by the phase grating, pitch length p of the phase grating, refractive index n of base material of the phase grating, refractive index $n_0$ of medium surrounding the phase grating, and shape ratio e as the ratio of grating depth to width of slope of the concave part.

A fabricating method of phase grating of the preset invention of claim 5 comprises, a step of applying and forming a film on a base material for forming a phase grating, a step of fabricating a mask by forming pattern on the film, and a step of etching a grating in the base material through the mask, in a depth deeper in a specific range than depth d' calculated in a formula $$ln - n_0 \times (p - d'/e)/p \times d' = (\lambda/2) \times (1 + 2m) \text{ (where } m = 0, \pm 1, \pm 2, \ldots )$$

in terms of center wavelength $\lambda$ of light having partial interference to be diffracted by the phase grating, pitch length p of the phase grating, refractive index n of base material of the phase grating, refractive index $n_0$ of medium surrounding the phase grating, and shape ratio e as the ratio of grating depth to width of slope of the concave part.

An optical encoder of the present invention of claim 10 comprises a light source for emitting light having partial interference, a fixed diffraction plate and a movable diffraction plate respectively having the phase grating of claim 1, being disposed substantially vertical to the optical axis of the light ejected from the light source, and a photo detector for receiving diffracted light of specific order other than 0 order passing through the fixed diffraction plate and movable diffraction plate.

According to the constitution of claim 1, when using a light source for emitting spontaneous radiant light such as LED, a phase grating capable of minimizing the 0 order diffraction efficiency can be obtained.

Its action is not completely elucidated, and the action considered by the invention at the present is discussed below. The phenomenon is that a difference occurs in the grating depth for minimizing the 0 order diffraction efficiency depending on whether spontaneous radiant light is used or induction radiant light is used as the light source. A great difference between the spontaneous radiant light and induction radiant light lies in the degree of coherence. The latter has a complete coherence, whereas the former has a partial coherence. This difference in interference seems to be expressed as difference in grating depth for minimizing the 0 order diffraction efficiency.

According to the constitution of claim 5, the grating depth can be set to a larger value than the grating depth calculated by using a known formula for minimizing the 0 order diffraction efficiency, from the wavelength of light, pitch length of phase grating, refractive index of base material of the phase grating, refractive index of medium of the surrounding of the phase grating, and the shape ratio as the ratio of grating depth to the width of the slope part as the boundary of concave part and convex part formed always when fabricated through conventional process such as etching, and therefore the phase grating for minimizing the 0 order diffraction efficiency when using spontaneous radiant light as light source is obtained.

According to the constitution of claim 10, using a light source for emitting spontaneous radiant light such as LED of high reliability, and by using a phase grating having a nearly rectangular waveform with a grating depth larger than the grating depth calculated by using a known formula for minimizing the 0 order diffraction efficiency, from the wavelength of light, pitch length of phase grating, refractive index of base material of the phase grating, refractive index of medium of the surrounding of the phase grating, and the shape ratio as the ratio of grating depth to the width of the slope part as the boundary of concave part and convex part formed always when fabricated through conventional process such as etching, the intensity of diffracted light of 0 order causing distortion in the output signal of photo detector by interference with the diffracted light of ±1st order can be reduced, so that an optical encoder of high reliability suppressed in distortion of detected signal is obtained.

Figure 1:
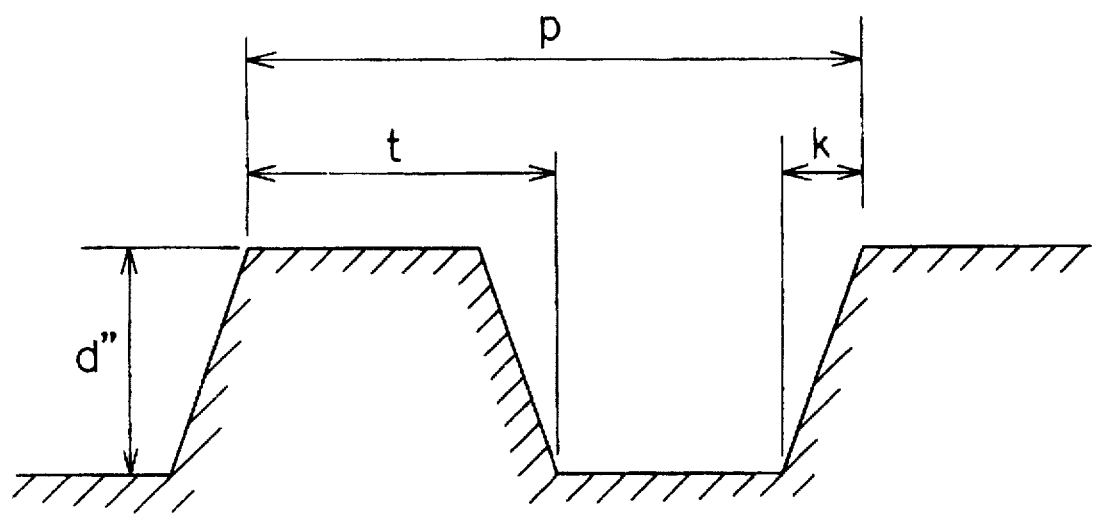
FIG. 1 is a sectional view of phase grating according to an embodiment of the invention.

| [Reference Numerals] | |
|---|---|
| 1, 31 | Light source for emitting spontaneous radiant light |
| 2, 32 | Collimating lens |
| 3A, 33B | Fixed grating plate |
| 4A, 34B | Movable grating plate |
| 5, 35 | Condenser lens |
| 6, 36 | Photo detector |
| 7, 37 | Light detecting part |
| 8, 38 | Frequency discriminating filter |
| 60 | Substrate |
| 61 | Photo resist |
| 62 | Photo mask |
| d, d" | Depth grating |
| p | Length of one pitch |
| t | Length for composing convex part in one pitch |
| k | Length of slope portion |
| e | Shape ratio (a/d) |
| f | Duty (c/b) |

PREFERRED EMBODIMENTS OF THE INVENTION

Referring now to the drawings, an embodiment of the invention is described in detail below.

Figure 9:
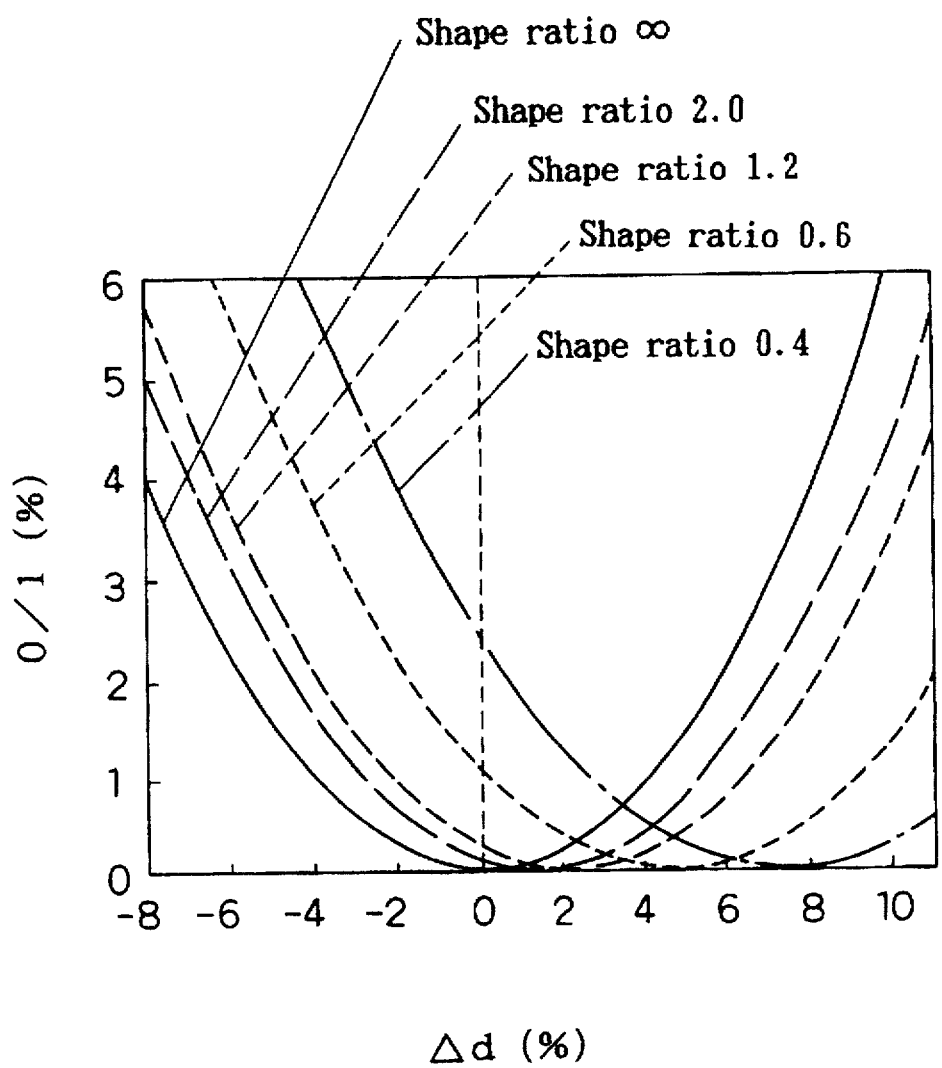
FIG. 9 is a diagram showing shape ratio dependence of the relation of diffraction efficiency of phase grating and grating depth.
Figure 10:
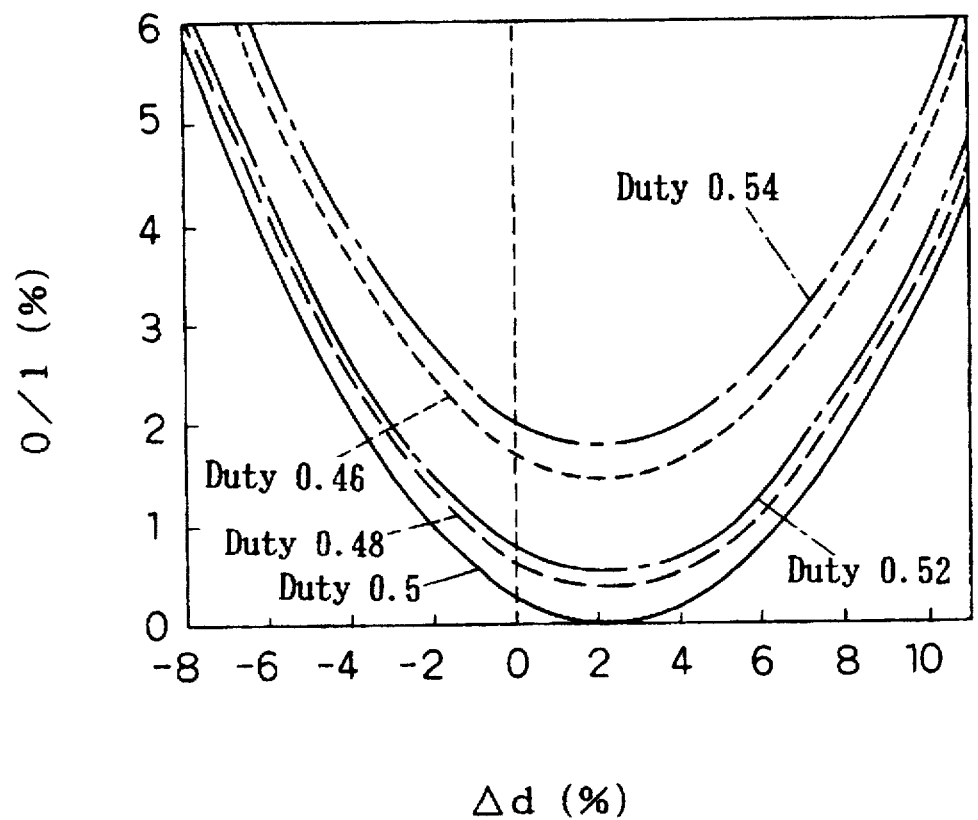
FIG. 10 is a diagram showing duty dependence of the relation of diffraction efficiency of phase grating and grating depth.

As mentioned above, the grating depth for minimizing the 0 order diffraction efficiency is calculated by center wavelength of light source, refractive index n of the material for composing the phase grating, refractive index $n_0$ of the surrounding of the phase grating, pitch p of the phase grating, and shape ratio e of the phase grating. Supporting the calculated value to be d', d' is determined from formula 2, and varies depending on e as shown in FIG. 9.

FIG. 1 shows a sectional shape of a phase grating made of $SiO_2$ according to an embodiment of the invention. In FIG. 1, grating depth d" is $$d"=d'\times(1+\Delta d') \qquad (3)$$

and this value is greater than calculated value d' of grating depth for minimizing the 0 order diffraction efficiency, by a rate of $\Delta d'$.

Fabricating phase gratings of pitch length 24 μm and various grating depth d" values (about 650 to 800 nm), the diffraction efficiency was measured by using plural types of light source.

Figure 11:
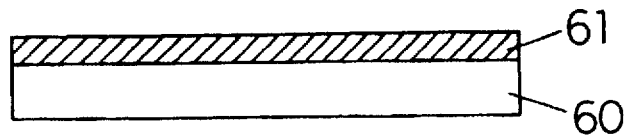
FIGS. 11(A)–11(E) are process diagrams of photo etching of fabricating method of phase grating.
Figure 11:
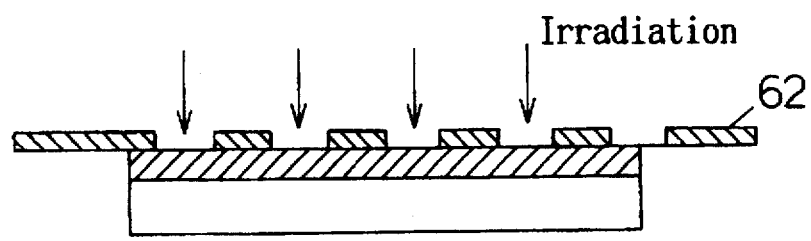
Figure 11:
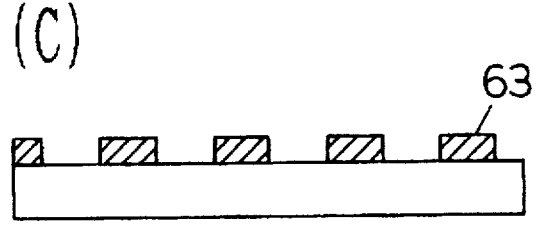
Figure 11:
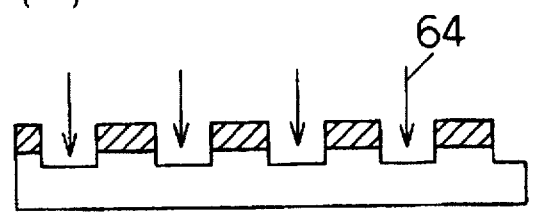
Figure 11:
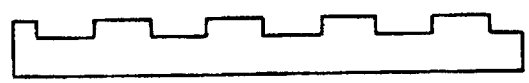
Figure 12:
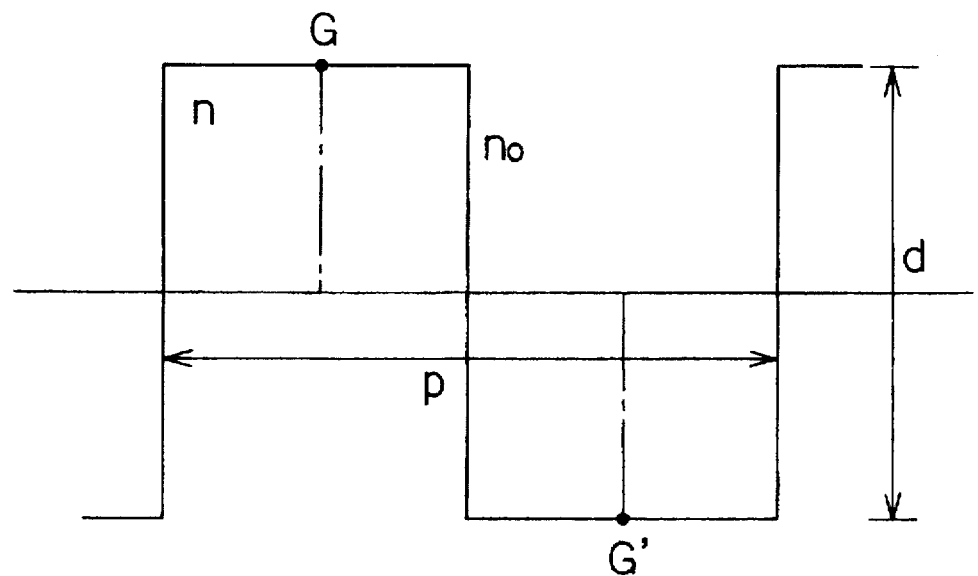
FIGS. 12(A) and 12(B) are relation diagrams of grating shape and center of gravity.
Figure 12:
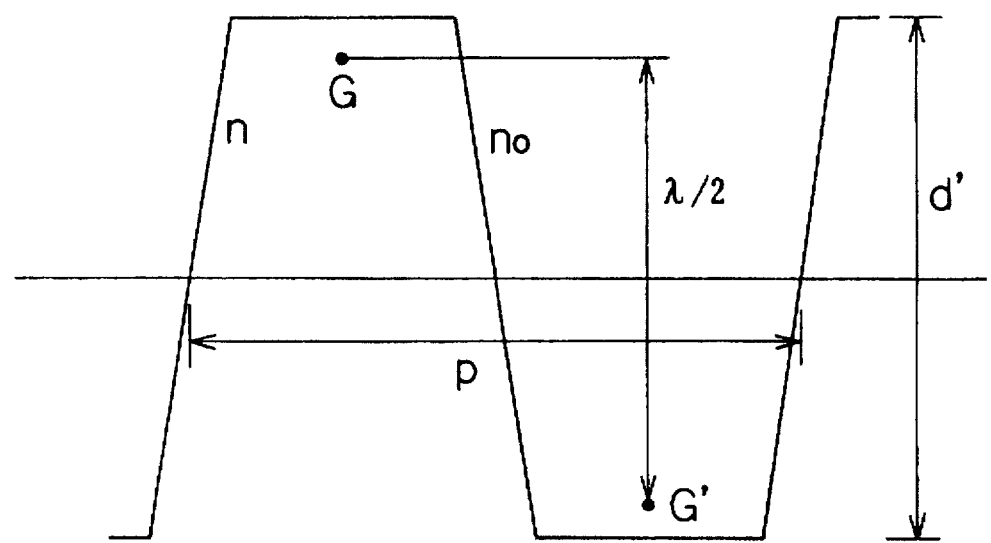

FIG. 11 shows an embodiment of fabricating method of phase grating having a nearly rectangular waveform, relating to a known processing method called photo etching.

First, photo resist 61 is uniformly applied on the surface of a substrate 60 which is a base material for fabricating the shape of phase grating, and the photo resist 61 is exposed through a photo mask 62 which is a separately fabricated plate. The photosensitized portion of the photo resist 61 is made soluble in developing solution (or, to the contrary, the photosensitized portion may be made insoluble in developing solution in other case), and the photosensitized portion is removed by the developing solution, and a pattern 63 of photo resist is formed.

Afterwards, using an ordinary dry etching device (not shown), mainly the portion without photo resist is chemically removed by using etching gas 64.

Since the grating depth is determined by the product of the etching rate and etching time, the means for controlling the grating depth may be selected from the method of controlling the etching rate and the method of controlling the etching time, by changing the type of etching gas, or magnitude of energy such as calorific value and AC power given for promoting or suppressing the reaction between the etching gas and substrate. In the phase grating fabricated herein, the grating depth was controlled by the etching time.

By removing the remaining photo resist consequently, the shape of the phase grating is fabricated.

As the etching process, meanwhile, instead of dry etching, a wet etching device may be used together with etching solution.

The grating depth of phase grating was measured by using a probe type depth meter. Measuring errors of depth were about 5 nm.

The shape ratio of phase grating was measured by SEM (scanning electron microscope) and optical microscope. It is known that the shape ratio of phase grating is hardly changed by the etching time and is nearly determined by the type of etching gas.

With $CHF_3$ gas used in the present fabrication, in the phase grating having any grating depth, the shape ratio was about 1.1 to 1.5, and when expressed in angle, it was about 48° to 56°.

Accordingly, from the curve of shape ratio 1.2 in the result in FIG. 9 (the value of Δd for minimizing the 0 order diffraction efficiency in the phase grating with shape ratio 1.1 and 1.5 had a difference of only about 0.1% as compared with the case of shape ratio 1.2, which can be ignored, and hence it was represented by the curve of shape ratio 1.2), the grating depth d' for minimizing the 0 order diffraction efficiency is about 2% larger than the value d obtained in formula 1, supposing m=0.

That is, the relation of $$\begin{aligned} d' &= d \times (1 + \Delta d) \\ &= d \times (1 + 0.02) \\ &= (\lambda/2)/|n - n_0| \times (1.02) \end{aligned} \quad (4)$$

is satisfied.

Using He—Ne laser light or induction radiant light as the light source, the diffraction efficiency was measured in the fabricated phase gratings.

Figure 2:
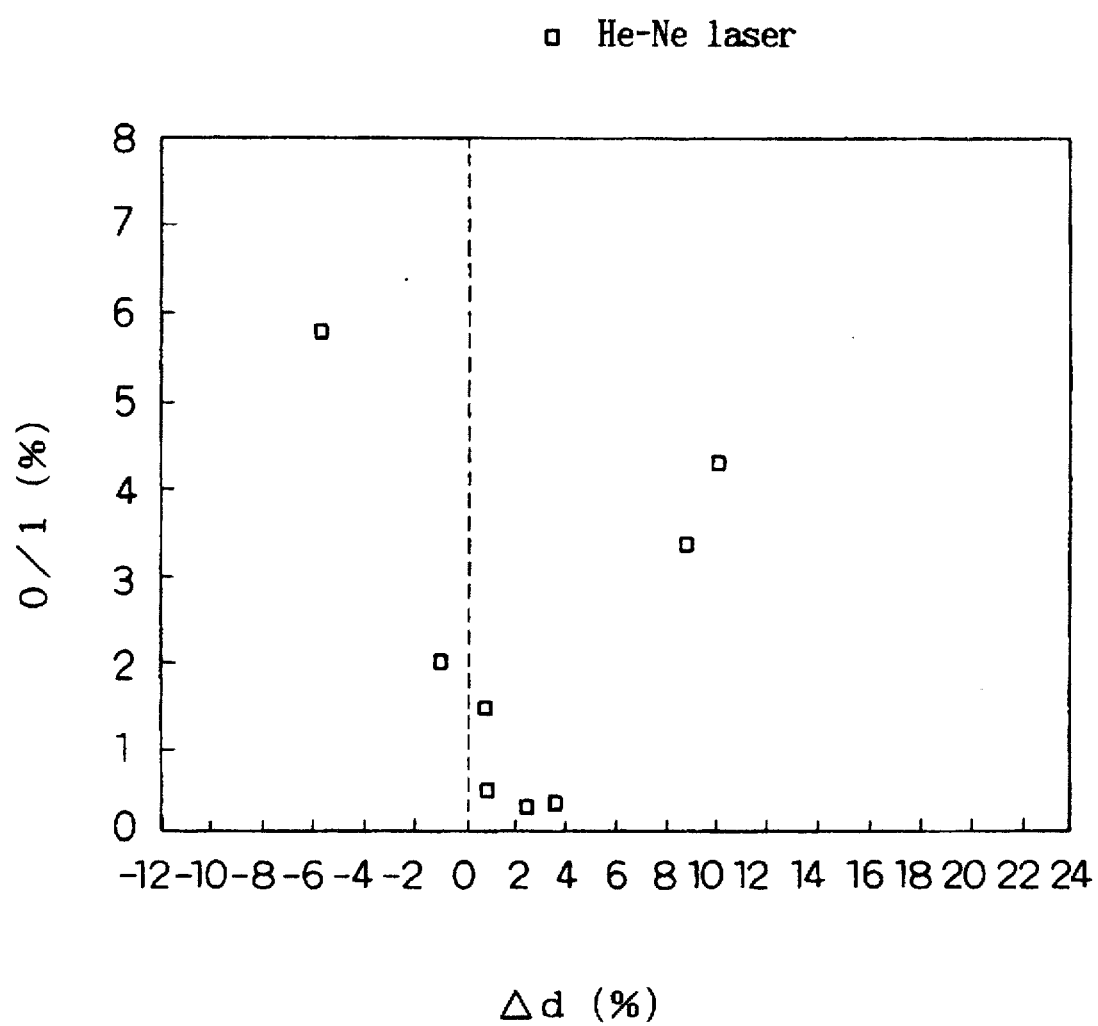
FIG. 2 is a diagram showing results of measurement of 0 order diffraction efficiency to induction radiant light in the same embodiment.

The results are shown in FIG. 2. The axis of ordinates denotes the 0 order diffraction efficiency relative to the 1st order diffraction efficiency, and the axis of abscissas expresses the deviation rate Δd of the grating depth from the value d obtained in formula 1 supposing m=0. Incidentally, the wavelength X of He—Ne laser light is 633 nm, and the refractive index of the phase grating material at this wavelength is 1.457.

From the results in FIG. 2, it is known that the 0 order diffraction efficiency is minimum in the phase grating of which Δd is about 2%, that is, the phase grating of which grating depth d" is d' in formula 4.

Thus, in the case of using induction radiant light as light source, the 0 order diffraction efficiency may be minimized when the grating depth is set to the value calculated according to the center wavelength λ of light source, refractive index n of the material for composing the phase grating, refractive index $n_0$ of the surrounding of the phase grating, and shape ratio e of the phase grating.

Figure 3:
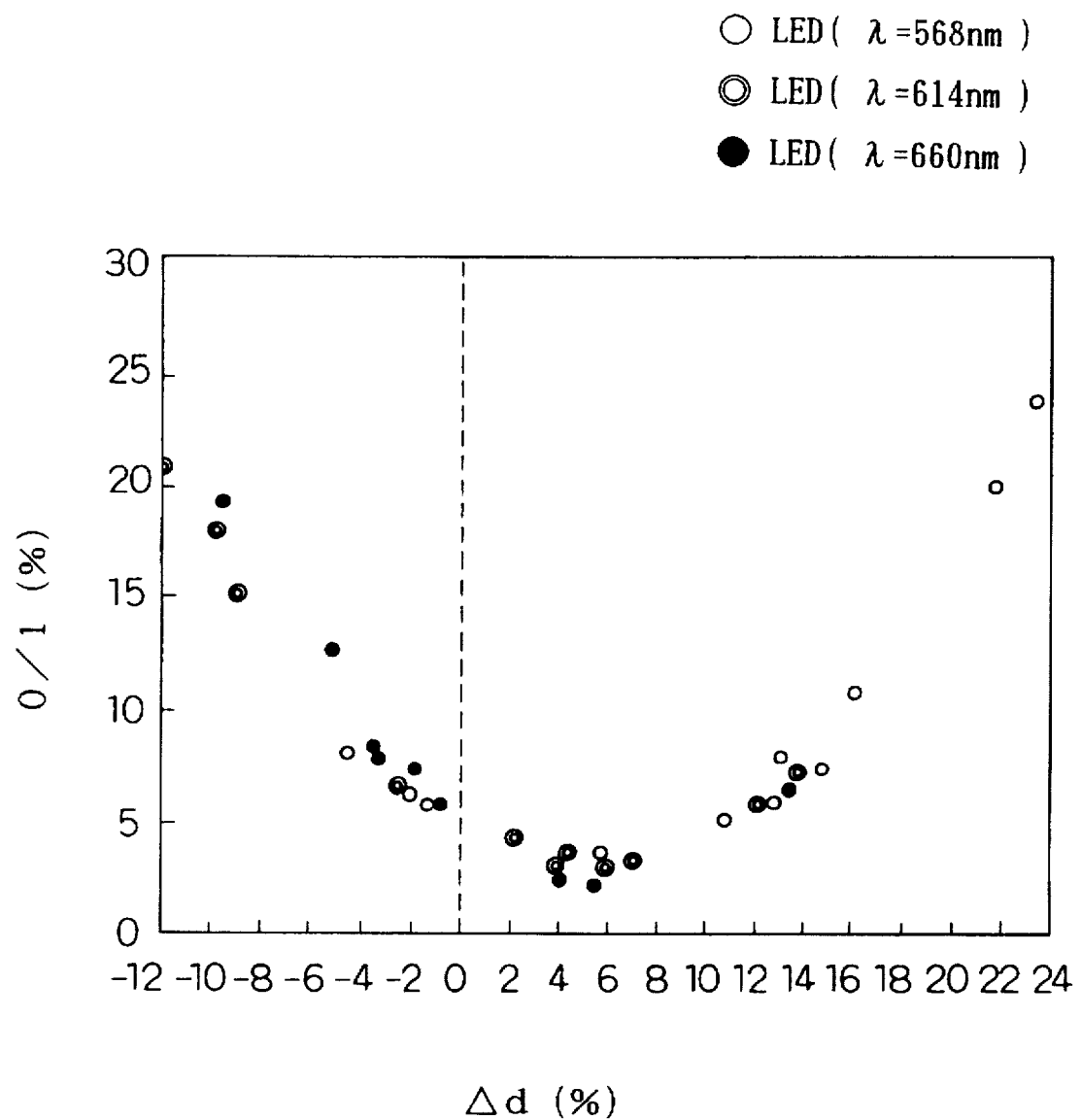
FIG. 3 is a diagram showing results of measurement of 0 order diffraction efficiency to spontaneous radiant light in the same embodiment.

Next, using LED light or spontaneous radiant light as the light source, results of measuring the diffraction efficiency of the fabricated phase gratings are recorded in FIG. 3. The axis of ordinates denotes the 0 order diffraction efficiency relative to the 1st order diffraction efficiency, and the axis of abscissas expresses the deviation rate Δd of the grating depth from the value d obtained in formula 1 supposing m=0. Three types of LED were used, and the center wavelength λ was respectively 568, 614, and 660 nm, and the wavelength distribution was a nearly Gaussian profile having a half-value width of about 20 nm.

The refractive index n of the phase grating material corresponding to each center wavelength is respectively 1.459, 1.457, and 1.456, and in FIG. 3 the blank circle mark indicates the diffraction efficiency when using LED light with center wavelength of 568, double circle by using LED light with center wavelength of 614 nm, and solid circle by using LED light with center wavelength of 660 nm.

It is known from the results in FIG. 3 that the 0 order diffraction efficiency is minimized in the phase grating of which Δd is about 5 to 7%, that is, the phase grating of which grating depth d" is larger than d' by 3 to 5%.

Figure 15:
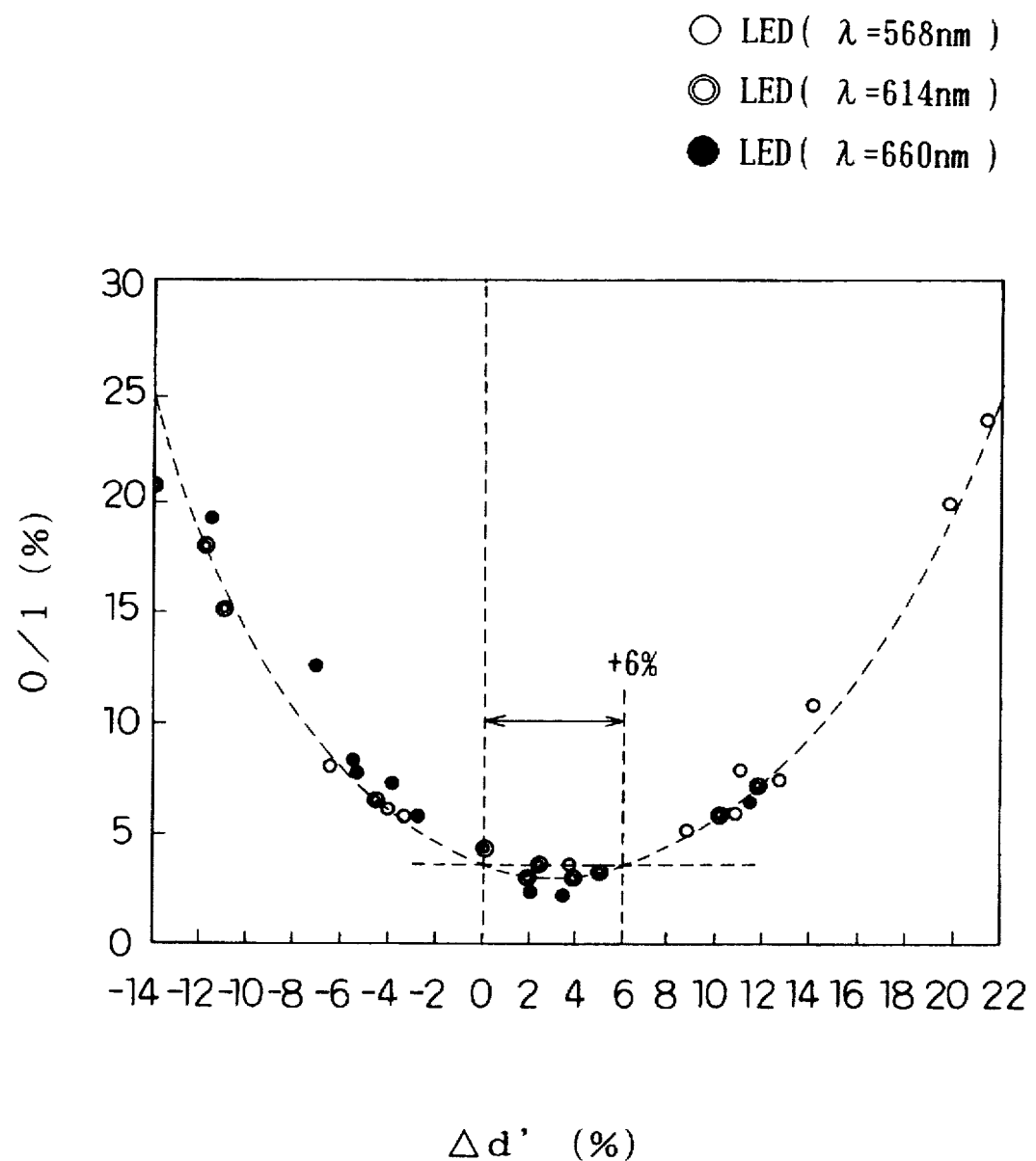
FIG. 15 is a diagram for explaining a range of the grating depth of the phase grating of the embodiment of the present invention.

Meanwhile with regard to the extent of said largeness the depth d is larger than the grating depth d' which is obtained with using the formula (2), by 0 to 6% as shown in FIG. 15 and thereby the 0 order diffraction efficiency can be made small.

In this way, when using spontaneous radiant light as light source, the 0 order diffraction efficiency can be minimized by defining the grating depth larger by 3 to 5% than the value calculated by the center wavelength λ of light source, refractive index n of the material for composing the phase grating, pitch p of phase grating, refractive index $n_0$ of the surrounding of phase grating, and shape ratio e of phase grating.

Thus, when spontaneous radiant light is used as light source, by setting the grating depth larger than the calculated value by 3 to 5%, in the phase grating of which shape ratio is 1.0 to 1.4, the 0 order diffraction efficiency can be minimized, and by setting the grating depth larger than the calculated value by about 0 to 6%, the 0 order diffraction efficiency can be made small. That is, it is achieved by fabricating a grating having such a grating depth being able to make smaller the 0 order diffraction efficiency in comparison with the case using said calculated value.

Figure 4:
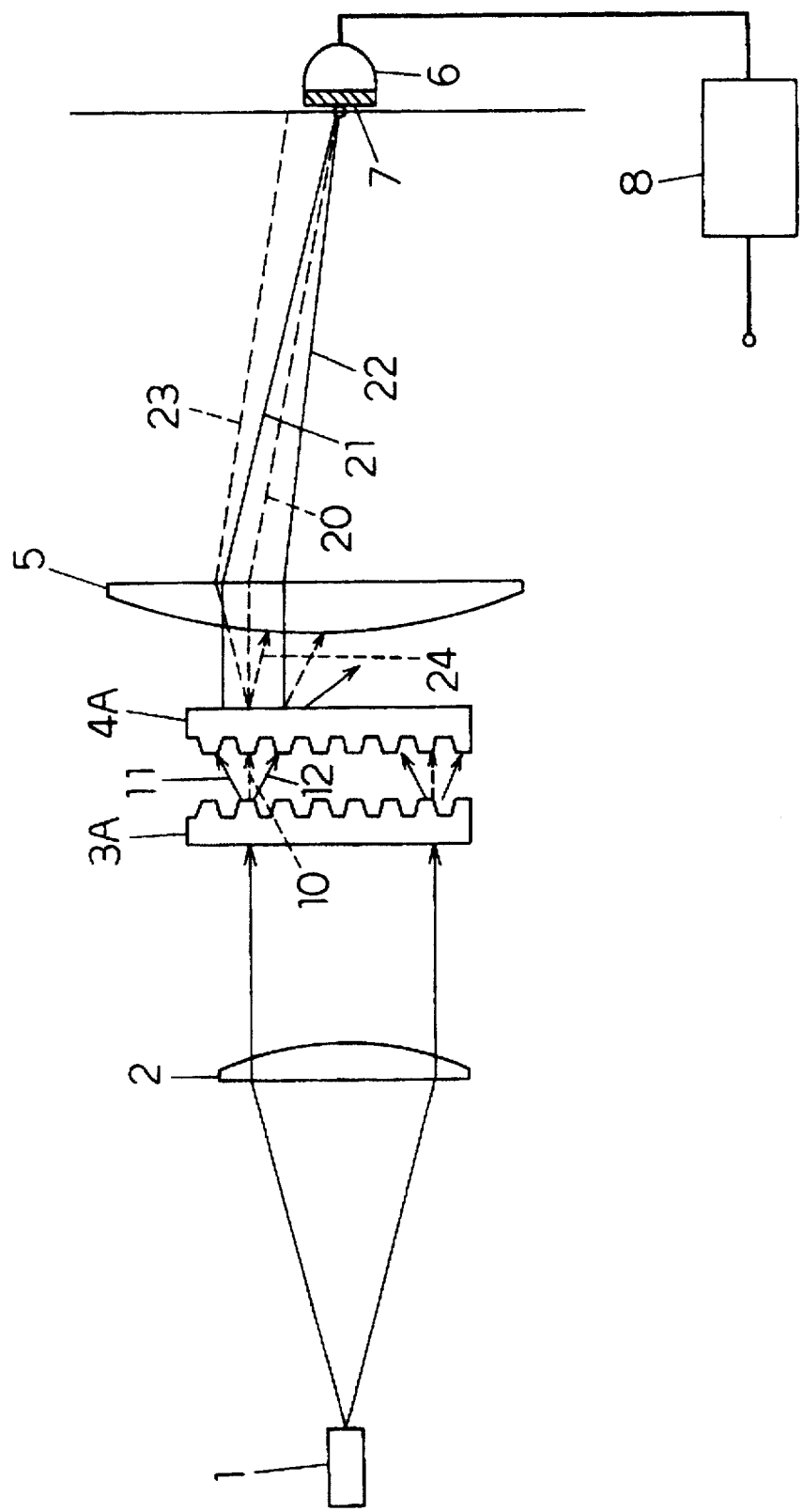
FIG. 4 is a schematic structural diagram of an optical encoder using phase grating in the same embodiment.

FIG. 4 shows a schematic structure of an optical encoder according to the embodiment, in which reference numeral 1 is a light source for emitting spontaneous radiant light having partial interference such as LED, 2 is a collimating lens for transforming the exit light from the light source 1 into parallel light, 3A is a fixed diffraction plate disposed vertically to the optical axis, having a phase grating of nearly rectangular waveform section, and 4A is a movable diffraction plate capable of moving in vertical direction, being disposed vertically to the optical axis, having a phase grating of nearly rectangular waveform section, and the phase grating of fixed diffraction plate 3A and phase grating of movable grating plate 4A have a mutually same period.

In the diagram, moreover, reference numeral 5 is a condenser lens for condensing the light passing through the movable diffraction plate 4A, 6 is a photo detector for converting the diffraction image condensed by the condenser lens 5 and formed in a light detecting part 7 into electric signal and sending out, and 8 is a frequency discriminating filter.

In the optical encoder of the embodiment, the exit light from the light source 1 is transformed into parallel light by the collimating lens 2, and is put into the fixed diffraction plate 3A in a direction nearly vertical to the fixed diffraction plate 3A.

The light entering the fixed diffraction plate 3A is diffracted by the fixed diffraction plate 3A, and is emitted as diffracted light 10 of 0 order, diffracted light 11 of +1st order, diffracted light 12 of −1st order, . . .

These diffracted lights 10, 11, 12 enter the movable diffraction plate 4A, and are further emitted as diffracted lights.

Figure 5:
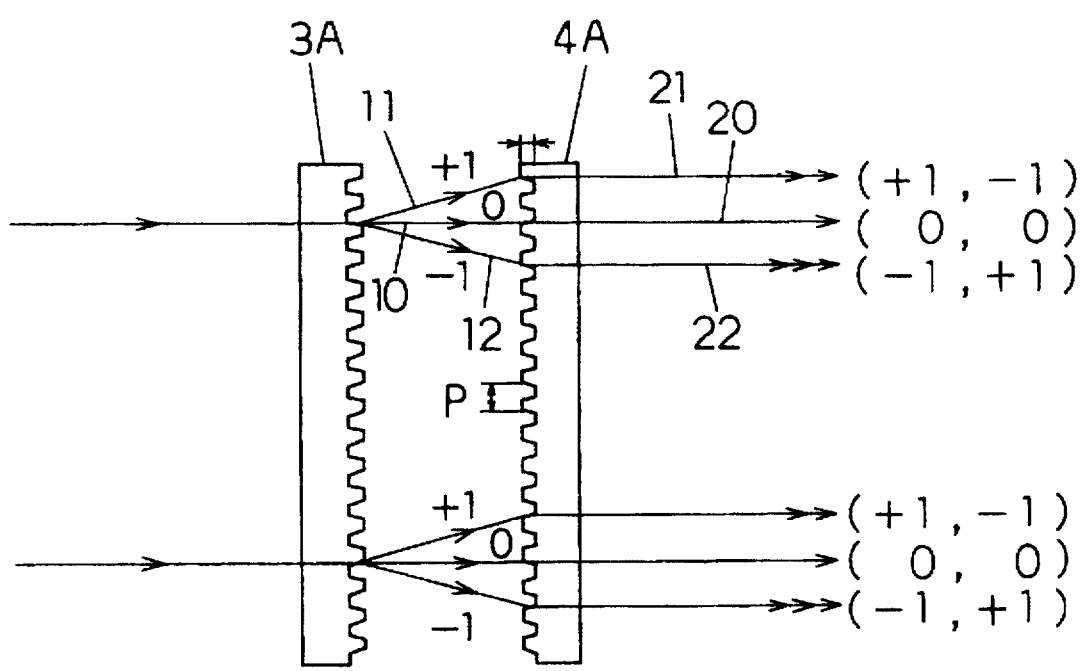
FIG. 5 is a schematic structural diagram of essential parts of the optical encoder in FIG. 4.

Expressing the diffracted lights emitted from the movable diffraction plate 4A to be (n, m) (where n is a diffraction order by fixed diffraction plate 3A, and m is a diffraction order by movable diffraction plate 4A), the diffracted lights passing through the movable diffraction plate 4A comprise, as shown in FIG. 5, diffracted light 20 of (0, 0), diffracted light 21 of (+1, −1), diffracted light 22 of (−1, +1), diffracted light of (−2, +2), diffracted light of (+2, −2), . . . In FIG. 4, however, for the convenience of illustration, diffracted light of (−2, +2), diffracted light of (+2, −2), and diffracted lights of higher order than the diffracted light of 2nd order are omitted.

When the movable diffraction plate 4A is moved at a constant speed in the vertical direction to the optical axis (vertical direction in FIG. 4), the phase of the diffracted light of higher order than 0 order changes along with the move, relatively to the phase of the diffracted light of 0 order, and therefore, the light intensity of interference waves obtained by interference of, for example, diffracted light 21 of (+1, −1) and diffracted light 22 of (−1, +1) changes in a form of sinusoidal wave.

Similarly, the light intensity of interference wave of diffracted light 21 (+1, −1) and diffracted light 20 of (0, 0), or interference wave of diffracted light 22 (−1, +1) and diffracted light 20 of (0, 0) changes periodically along with the move of the movable diffraction plate 4A.

Figure 6:
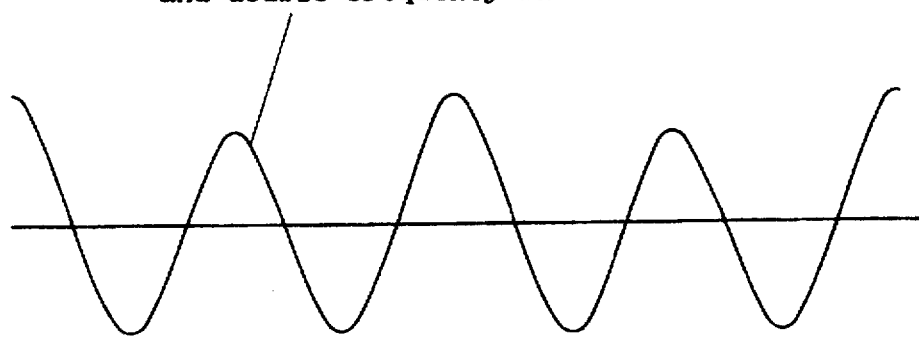
FIGS. 6(A) and 6(B) are output signal waveforms diagram in the optical encoder in FIG. 4.
Figure 6:
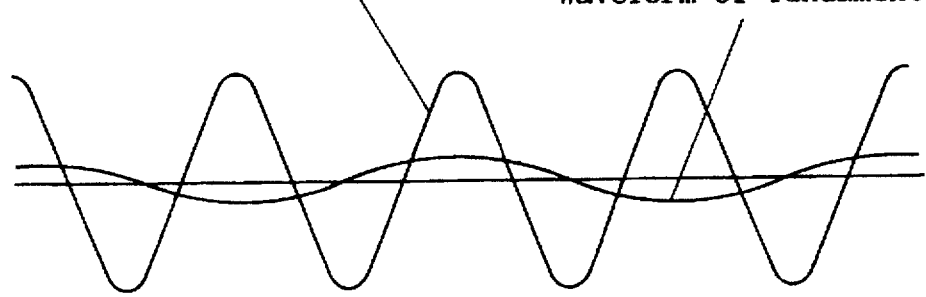
Figure 7:
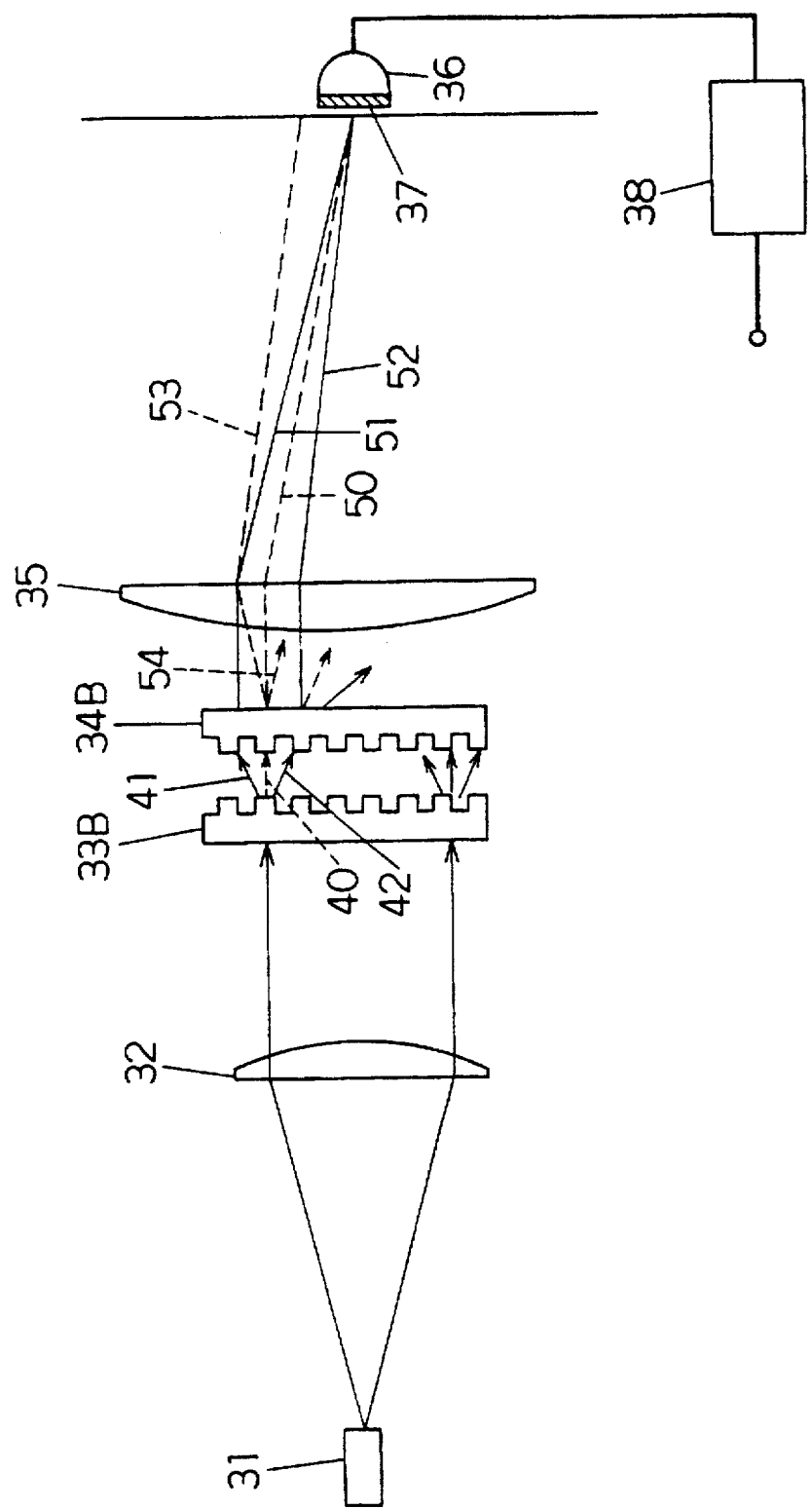
FIG. 7 is a schematic structural diagram of a conventional optical encoder.
Figure 8:
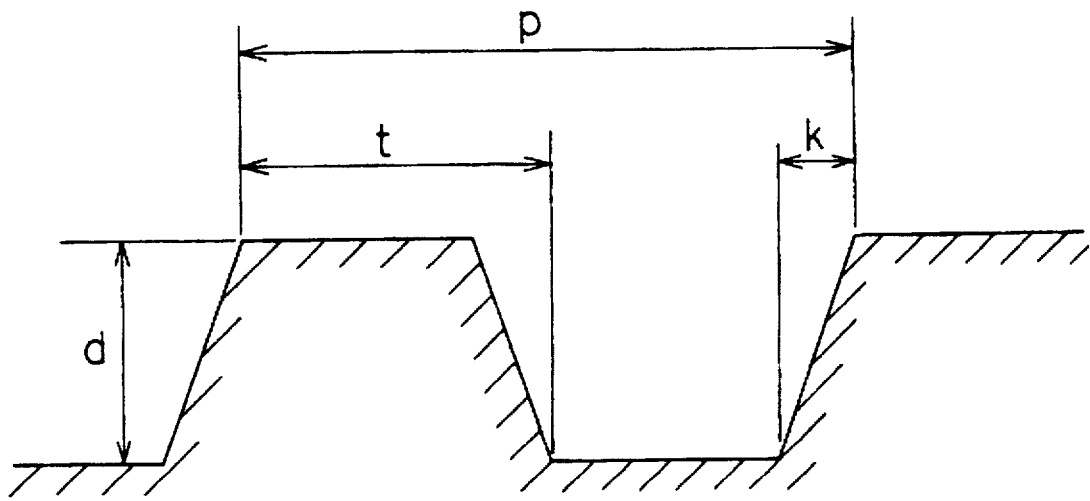
FIG. 8 is a sectional view of ordinary phase grating.

The diffracted light 20 of (0, 0) interferes with diffracted light 21 of (+1, −1) or diffracted light 22 of (−1, +1), and the output of the fundamental wave (FIG. 6 (b)) of sinusoidal waveform is obtained, in which the light intensity reaches the maximum when the peak and bottom of the nearly rectangular waveform of fixed diffraction plate 3A and movable diffraction plate 4A are matched, and the light intensity is minimum when the peak and bottom of the nearly rectangular waveform are mutually deviated by half period p/2.

On the other hand, diffracted light 21 of (+1, −1), and diffracted light 22 of (−1, +1) interfere each other, and an output of double frequency (FIG. 6 (b)) composed of a sinusoidal wave having a double frequency of fundamental wave is obtained.

In FIG. 4, reference numeral 23 expressed diffracted light of (0, +1), and 24 is diffracted light of (+1, +1). The output of photoelectric converted signal of the photo detector 6 in the embodiment is obtained as a distorted waveform as shown in FIG. 6 (a) when expressed emphatically. This distorted waveform may be regarded by dividing into the component of fundamental wave and component of double frequency as shown in FIG. 6 (b), but using the fixed plate and movable plate having phase gratings giving grating depth greater than the calculated value, the diffracted light of 0 order of the both diffraction plates is suppressed, and the diffracted light 20 of (0, 0) is feeble. Hence, the component of double frequency can be sufficiently detected, and it can be detected at high precision.

In the optical encoder of the embodiment, the condenser lens for condensing the diffracted light in the light detecting part is used, but without using condenser lens, the diffracted light may be directly received in the light detecting part. In this case, the encoder may be further reduced in size.

Figure 13:
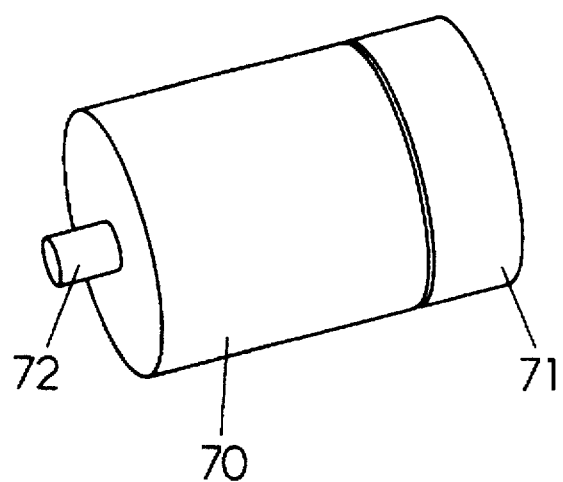
FIG. 13 is a perspective view showing a motor using the optical encoder of the present invention.

A motor especially a servo motor using the optical encoder according to the embodiment is shown in FIG. 13. In the FIG. 13(a) servo motor 70 is a motor of which angle is detected by an encoder 71 mounted on a motor shaft 72, and of which action is controlled depending on the signal.

As shown in FIG. 6(a), the diffracted light of 0 order emitted from the diffraction grating causes a distortion in the encoder output, showing large and small intensity in every other pulse.

Figure 14:
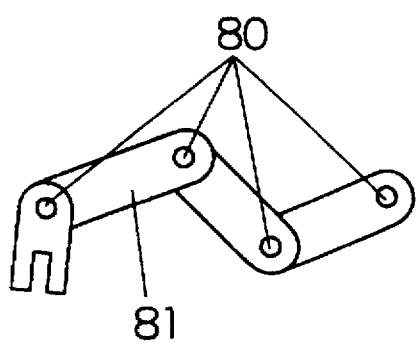
FIG. 14 is a perspective view showing a robot driven by a motor using the optical encoder of the present invention.

FIG. 14 shows that the servo motor 80 is built in a movable part of a robot arm 81.

Therefore, by employing the encoder using the diffraction grating suppressed in the diffracted light intensity of 0 order in the servo motor, the angle detection precision of encoder is enhanced, so that the positioning precision of the servo motor may be improved.

According to the phase grating of claim 1, by giving a larger grating depth than the grating depth calculated by using a known formula for minimizing the 0 order diffraction efficiency, from the wavelength $\lambda$ of light, pitch length p of phase grating, refractive index n of base material of the phase grating, refractive index $n_0$ of medium of the surrounding of the phase grating, and the shape ratio e as the ratio of grating depth to the width of the slope part as the boundary of concave part and convex part formed always when fabricated through conventional process such as etching, the 0 order diffraction efficiency when using spontaneous radiant light as light source can be suppressed.

According to the fabricating method of phase grating of claims 5 to 9, when using spontaneous radiant light as light source, from the conditions of grating depth necessary for the phase grating having a nearly rectangular waveform for suppressing the 0 order diffraction efficiency, that is, the wavelength of light, pitch length p of phase grating, refractive index n of base material of the phase grating, refractive index $n_0$ of medium of the surrounding of the phase grating, and the shape ratio e as the ratio of grating depth to the width of the slope part as the boundary of concave part and convex part formed always when fabricated through conventional process such as etching, stamping, or injection, it is possible to give the conditions having the grating depth of a larger value than the grating depth calculated by the known formula for minimizing the 0 order diffraction efficiency.

According to the optical encoder of claims 10 and 11, using spontaneous radiant light as light source, the reliability such as life can be enhanced, and also using movable diffraction plate and fixed diffraction plate having phase gratings possessing nearly rectangular waveform for minimizing the 0 order diffraction efficiency causing distortion in the output signal of the photo detector by interference with diffracted light of ±1st order when using spontaneous light as light source, a detection signal small in distortion can be obtained.

What is claimed is:

1. A phase grating having a concave part of substantially rectangular shape, of which grating depth is deeper by a specific range of values than depth d' calculated in a formula $$|n-n_0|\times(p-d'/e)/p\times d'=(\lambda/2)\times(1+2m) \text{ (where } m=0, \pm1, \pm2, \ldots)$$

in terms of center wavelength $\lambda$ of light having partial coherence to be diffracted by the phase grating, pitch length p of the phase grating, refractive index n of base material of the phase grating, refractive index $n_0$ of medium surrounding the phase grating, and shape ratio e as the ratio of grating depth to width of slope of the concave part.

2. A phase grating of claim 1, wherein the specific range is 3 to 5% of the depth d'.

3. The phase grating as defined in claim 1, wherein said grating is formed by stamping.

4. The phase grating as defined in claim 1, wherein said grating is formed by injection.

5. A fabricating method of phase grating comprising, a step of applying and forming a film on a base material for forming a phase grating, a step of fabricating a mask by forming pattern on the film, and a step of etching a grating in the base material through the mask, in a depth deeper in a specific range than depth d' calculated in a formula $$|n-n_o| \times (p-d'/e)/p \times d' = (\lambda/2) \times (1+2m) \text{ (where } m=0, \pm 1, \pm 2, \ldots )$$

in terms of center wavelength $\lambda$ of light having partial coherence to be diffracted by the phase grating, pitch length p of the phase grating, refractive index n of base material of the phase grating, refractive index $n_o$ of medium surrounding the phase grating, and shape ratio e as the ratio of grating depth to width of slope of the concave part.

6. A fabricating method of phase grating of claim 5, wherein the etching is done by using an etchant, and the etching depth is controlled by the etching time.

7. A fabricating method of phase grating of claim 5, wherein the etching is done by using an etchant, and the etching depth is controlled by the concentration of the etchant.

8. A fabricating method of phase grating of claim 5, wherein the etching is done by using an etchant, and the energy relating to the etching depth is controlled.

9. A fabricating method of phase grating of claim 8, wherein the control of energy is to control the temperature.

10. An optical encoder comprising a light source for emitting light having partial coherence, a fixed diffraction plate and a movable diffraction plate respectively having the phase grating of claim 1, being disposed substantially vertical to the optical axis of the light ejected from the light source, and a photo detector for receiving diffracted light of specific order other than 0 order passing through the fixed diffraction plate and movable diffraction plate.

11. An optical encoder of claim 10, further comprising a condenser lens for condensing the diffracted light of specific order other than 0 order passing through the fixed diffraction plate and movable diffraction plate in the light receiving part of the photo detector.

12. A motor comprising the optical encoder of claim 11, which is used for controlling of the motor.

13. A robot comprising the motor of claim 12 at least in one position of a drive unit, said motor for driving the drive unit.

* * * * *